（12） United States Patent
Lee

(10) Patent No.: US 6,496,290 B1
(45) Date of Patent: Dec. 17, 2002

(54) OPTIC REPEATER SYSTEM FOR EXTENDING COVERAGE

(75) Inventor: Hyo Jin Lee, Seoul (KR)

(73) Assignee: LG Telecom, Inc., Seoul (KR)

( * ) Notice: Subject to any disclaimer, the term of this patent is extended or adjusted under 35 U.S.C. 154(b) by 0 days.

(21) Appl. No.: 09/213,405

(22) Filed: Dec. 17, 1998

(30) Foreign Application Priority Data

Jan. 31, 1998 (KR) .............................. 98-2667

(51) Int. Cl.[7] ........................ H04J 14/08; H04B 10/16; H04B 10/10
(52) U.S. Cl. ...................... 359/136; 359/145; 359/167; 359/174
(58) Field of Search .................. 359/174, 176, 359/172, 167, 136, 145, 137, 173, 179; 379/52.1

(56) References Cited

U.S. PATENT DOCUMENTS 5,339,184 A * 8/1994 Tang ........................... 359/124
5,689,355 A * 11/1997 Okubo et al. ............... 359/179
5,832,389 A * 11/1998 Dent ........................... 455/562
5,940,196 A * 8/1999 Piehler et al. ............... 359/133
5,970,406 A * 10/1999 Komara ...................... 455/422
6,122,083 A * 9/2000 Ohta et al. .................. 359/137
6,148,010 A * 11/2000 Sutton et al. ................ 370/536
6,208,833 B1 * 3/2001 Preschutti et al. ........... 455/3.1

* cited by examiner

Primary Examiner—Leslie Pascal
(74) Attorney, Agent, or Firm—Fleshner & Kim, LLP

(57) ABSTRACT

A mobile communication system with fiberoptic system is disclosed to expand the service coverage of one base station. The fiberoptic mobile communication system includes a plurality of slave fiberoptic repeaters processed by a plurality of combiners in the master fiberoptic repeater. By utilizing a plurality of combiners, the reception noise level is significantly reduced and the number of slave fiberoptic repeaters per master fiberoptic repeater can be increased.

17 Claims, 5 Drawing Sheets

OPTIC REPEATER SYSTEM FOR EXTENDING COVERAGE

FIELD OF THE INVENTION

The present invention relates to a fiberoptic system for a mobile communication system and more particularly for a mobile communication in remote regions.

BACKGROUND OF THE INVENTION

Generally, a mobile communication system allows radio data communication among mobile stations. FIG. 1 shows a mobile communication including a mobile switching center and one base station which provides a bi-directional communication service to a plurality of mobile stations by receiving and forwarding data from a mobile station to the mobile switching center or from the mobile switching center to a mobile station. The coverage of the base station to effectively serve a mobile station is determined by a transmission loss between a base station and a mobile station increases.

As the demand for mobile communication increased, a fiberoptic system was developed to enlarge the service coverage for a base station. Referring to FIG. 1, a fiberoptic system includes a master fiberoptic repeater connected to a slave fiberoptic repeater by a optical fiber cable. The slave fiberoptic repeater receives data from a mobile station and relays the data to the base station through the optical fiber cable. Likewise, the slave fiberoptic repeater receives data from a base station and transmits the data to a mobile staion. Thus, the fiberoptic system may effectively decreases the transmission loss between a base station and a mobile station.

Although the fiberoptic system somewhat enlarged the coverage of one base station to effectively transmit and receive radio frequency (RF) signals, in uninhabited and remote regions such as deep parts of mountains, rough valleys, or subterrains, the number of fiber optic systems which can be connected to one base station is limited by the reverse link noise floor. Such weak-converage regions are generally known as shadow regions. In order to solve the transmission problems, many base stations are being built above ground to cover the shadow regions. However, the cost of building and maintaining the base stations are becoming a big burden.

OBJECTIVES OF THE INVENTION

An object of the present invention is to solve at least the problems and disadvantages of the related art.

Particularly, an object of the present invention is to provide a fiberoptic system which can provide a high quality communication service in remote regions.

Another object of the present invention is to provide a fiberoptic system which extends the coverage of one base station of a mobile communication system with minimal cost.

Additional advantages, objects, an d features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, one embodiment of the fiberoptic mobile communication system includes a plurality of slave fiberoptic repeaters for one base station and one combiner in the master fiberoptic repeater to combine the signals from the plurality of slave fiberoptic repeaters. In another embodiment of the fiberoptic mobile communication system, a plurality of combiners in the master fiberoptic repeater combine the signals from the plurality of slave fiberoptic repeaters.

BRIEF DESCRIPTION OF THE DRAWING

The invention will be described in detail with reference to the following drawings in which like reference numerals refer to like elements wherein.

DETAILED DESCRIPTION OF THE INVENTION

Figure 1:
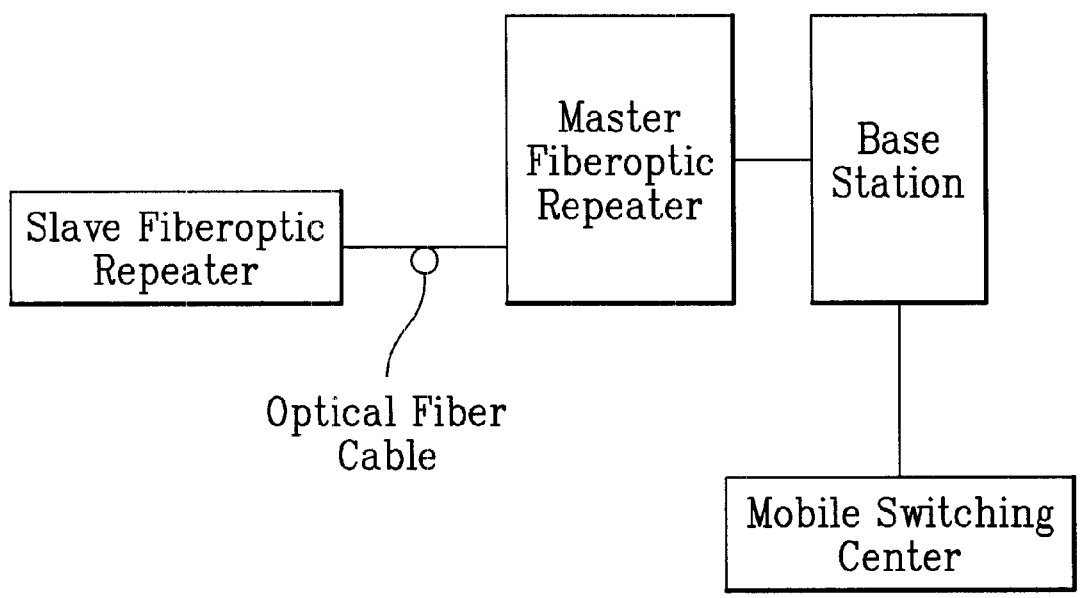
FIG. 1 shows a block diagram of a fiberoptic mobile communication system in the background art.
Figure 2:
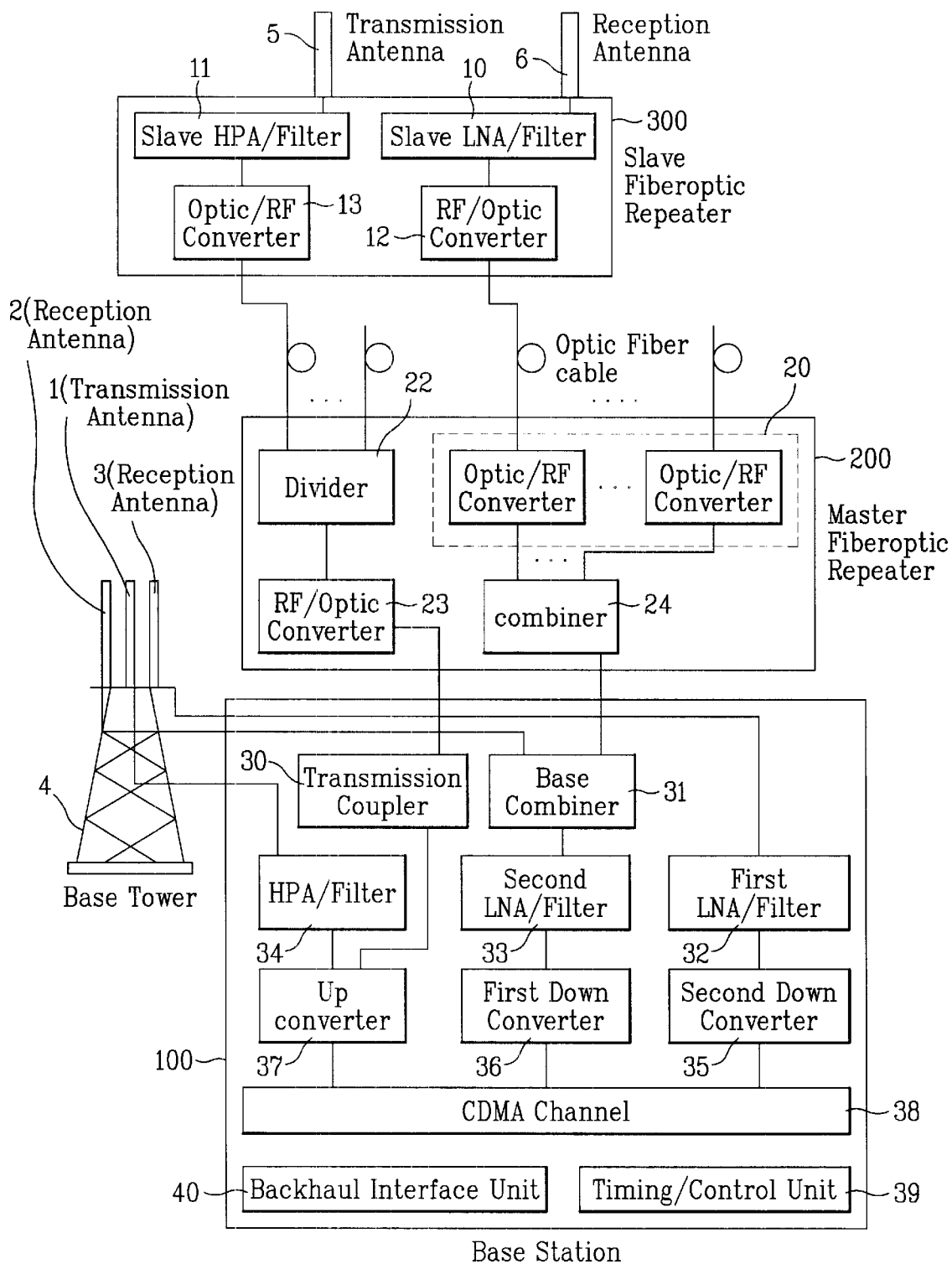
FIG. 2 shows one embodiment of a fiberoptic mobile communication system according to the present invention.

As shown in FIG. 2, one embodiment of a fiberoptic mobile communication system according to the present invention includes a base station 100, a master fiberoptic repeater 200, and a plurality of slave fiberoptic repeaters 300 distributed around the base station 100. Each slave fiberoptic repeater 300 receives and/or transmits RF signals within a region. The base station 100 has a transmission antenna 1 and first and second reception antennas 2, 3, all mounted on a base tower 4. The slave fiberoptic repeater also has a transmission antenna 5 and a reception antenna 6.

When a RF signal is transmitted from a mobile station, the reception antennas 2, 3 and 6 receives the RF signal. The first reception antenna 2 directly forwards the received the RF signal to the base combiner 31. The second reception antenna 3 directly forwards the received RF signal to a first low noise amplifier (LNA) and filter 32. The reception antenna 6 forwards the received RF signal within an allocated frequency range to a slave LNA/filter 10 of the slave fiberoptic repeater 300. The RF signal picks up noise during the air transmission and the LNA 10 amplifies the RF signal and noise. The filter 10 receives the amplified RF signal and extracts the portions of the RF signal appropriate for the base station 100. The filter 10 is generally a bandpass filter. The extracted signal is converted to an optical signal by a RF/Optic converter 12 and as an optical signal, the RF signal is transmitted through an optical cable to the master fiberoptic repeater 200.

The master fiberoptic repeater 200 has a plurality of Optic/RF converters 20 corresponding to the number of the slave fiberoptic repeaters 300, wherein each Optic/RF converter 20 is connected to one slave fiberoptic repeater 300 by an optical cable. Also, each Optic/RF converter 20 receives the optical signal transmitted from a slave fiberoptic repeater 300 and converts the optical signal back into a RF signal. A combiner 24 receives the RF signals converted from each optic/RF converters 20 and combines the plurality of RF signals into one RF signal.

The base station combiner 31 of base station 100 combines the RF signal received from the first reception antenna 2 and the RF signal received from the combiner 24 of the master fiberoptic repeater 200. The combined signal is forwarded to a second LNA/filter 33. The first LNA 32 directly receives the RF signal from the second reception antenna 3, the first LNA 32 amplifies the RF signal and noise picked up by reception antenna 3 while the second LNA 33 amplifies the RF signal and noise picked up by reception antennas 2 and 6. The filters 32 and 33 receives the amplified RF signals from the LNAs 32, 33 respectively and extracts the portions of the RF signal appropriate for the base station 100. The extracted signals from the first and second LNA/filter 32, 33 are forwarded to first and second down converters 35, 36 respectively.

The first and second down converters 35, 36 converts the received RF signals to baseband frequency signals and forwards the signals to a CDMA channel 38. The CDMA channel 38 extracts the pertinent data from the baseband signal and sends the extracted data to a mobile switching center (not shown). Specifically, the extracted data is forwarded to the mobile switching center through a backhaul interface unit 40, and a timing/control unit 39 outputs a timing signal for synchronizating the data as well as control signals to designate a communication channel for transmitting the data. The timing/control unit 39 also controls other elements of the base station 100.

On the other hand, when a RF signal is transmitted from the base station 100 to a mobile station, data is received by the CDMA channel 38 through the backhaul interface unit 40 from a mobile switching center. The timing/control unit 39 outputs a timing signals and control signals to designate a communication channel, one set of which is for receiving the data from the mobile switching center. The CDMA channel 38 incorporates the received data into a baseband signal and an up converter 37 converts the baseband signal into a high frequency signal. A high power amplifier (HPA) and filter 34 receives the high frequency signal from the up converter 37. The HPA 34 amplifies the signal to a suitable level for an effective transmission by the transmission antenna 1 and the filter 34 filters out the unnecessary portions from the amplified signal. The amplified signal is then forwarded to the transmission antenna 1 directly and to the master fiberoptic repeater 200 through the transmission coupler 30.

A RF/Optic converter 23 of the master fiberoptic repeater 200 receives the RF signals from the base station 100 and converts the RF signals to optical signals. The optical signals are divide into a plurality of optical signals by a divider 22 and each of the plurality of optical signal is transmitted through an optical cable to one of a plurality of slave fiberoptic repeater 300 distributed around the base station 100.

The slave fiberoptic repeater 300 receives the optical signal and converts the signal to a RF signal through a Optic/RF converter 13. The RF signal is forwarded to a slave HPA/filter 11 which amplifies and filters the pertinent portions of the signal. The pertinent RF signal is transmitted through the transmission antenna 5.

Figure 3A:
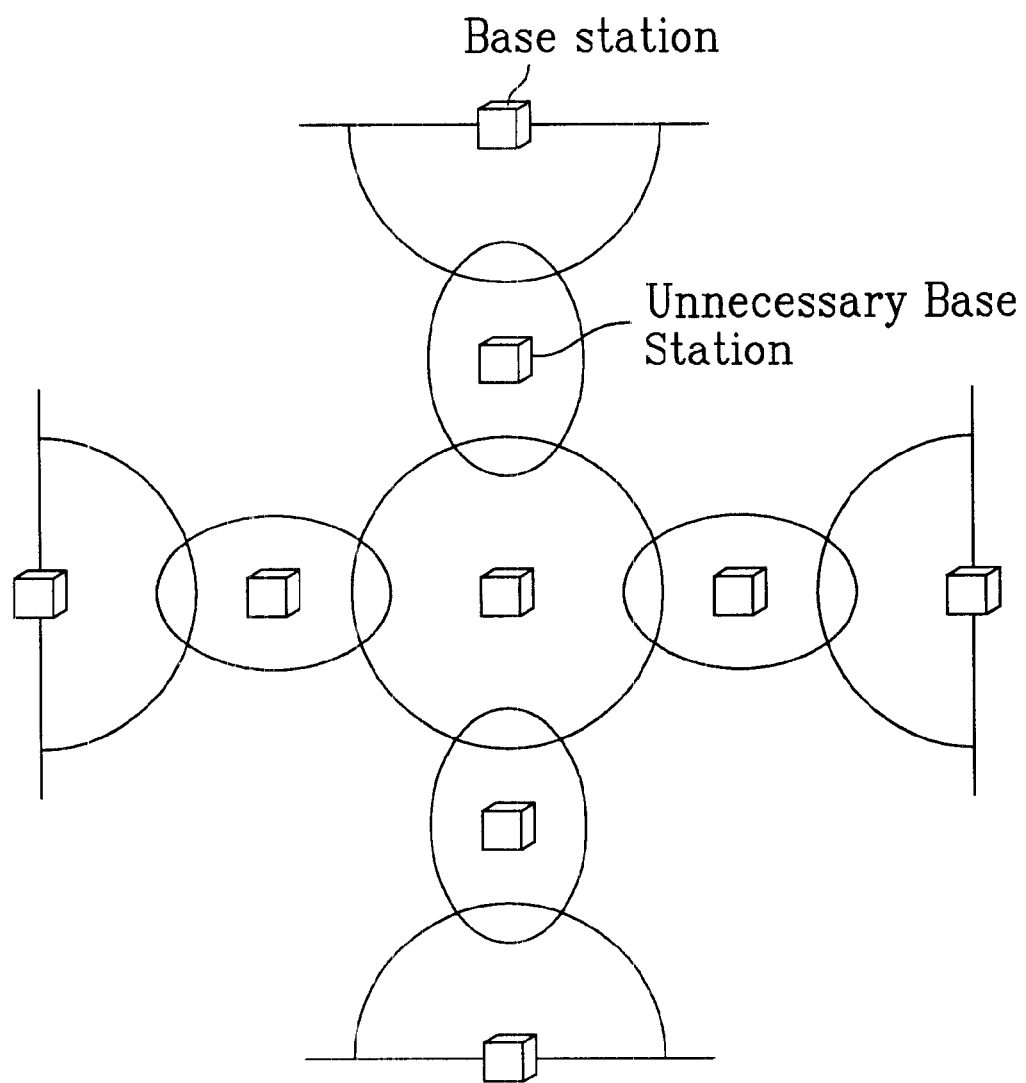
FIGS. 3(a) and (b) show a network diagram of a fiberoptic mobile communication system.
Figure 3B:
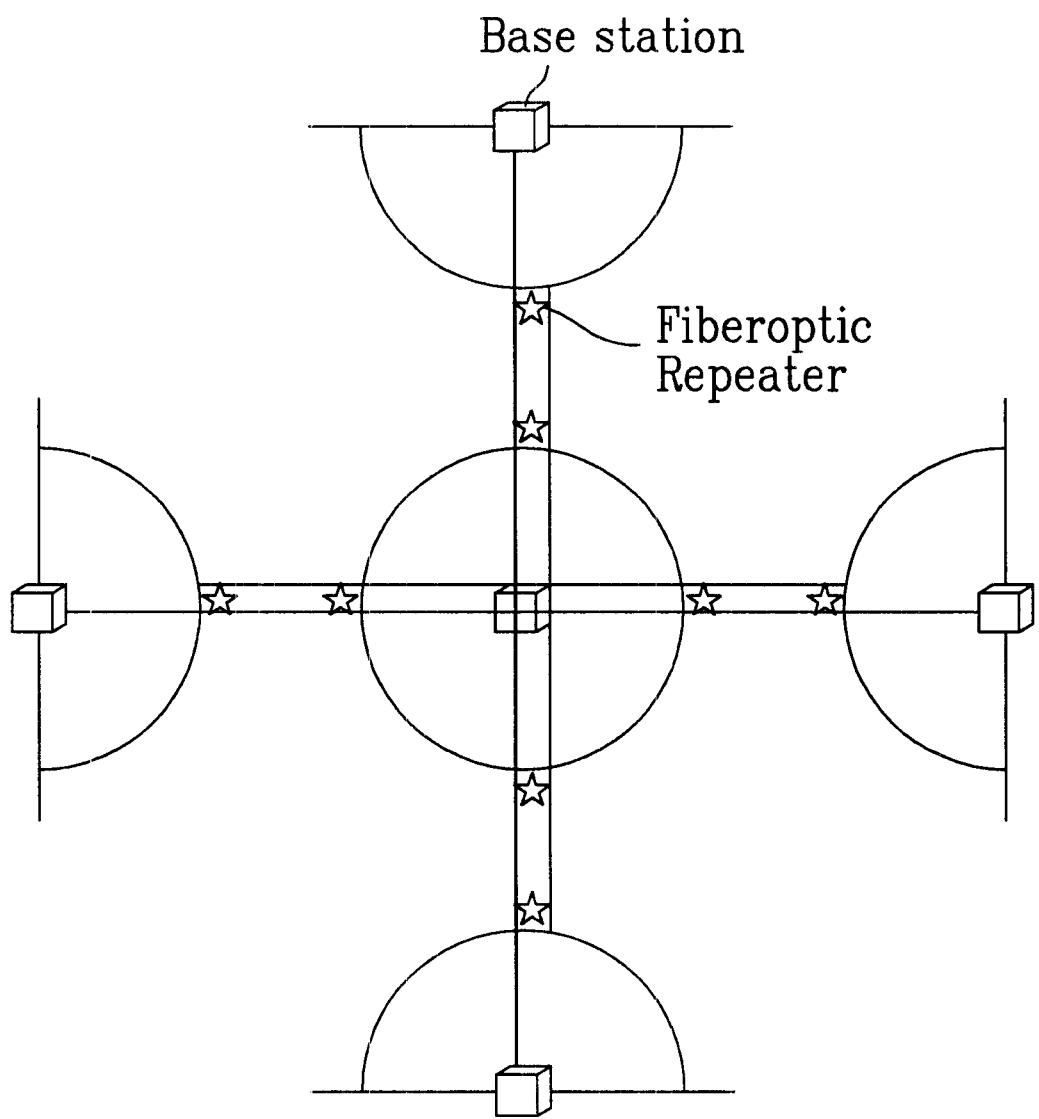

The above described fiberoptic mobile communication system allows sufficient communication in large buildings and subterrains by utilizing the existing base stations. With a fiberoptic mobile communication system, the same area covered by eight base stations can effectively covered by four base stations. FIG. 3(a) shows a network diagram of a mobile communication system and FIG. 3(b) shows a network diagram of a fiberoptic mobile communication system. As shown, a fiberoptic mobile communication system can replace four base stations. However, for N number of slave repeaters connected to the base station to extend the coverage of a mobile communication, a reception noise level is increased by 10log(N+1)dB. Because of the rise of noise level, the number of slave fiberoptic repeaters for an effective reception of signal transmissions is significantly reduced, thereby limiting the coverage region of one base station for the mobile communication.

Thus, a second embodiment of a fiberoptic mobile communication system according to the present invention includes a plurality of combiners in the master fiberoptic repeater. As in the first embodiment, the second embodiment of a fiberoptic mobile communication system also includes a plurality of slave fiberoptic repeaters. However, the plurality of slave fiberoptic repeaters are divided and processed by the plurality of combiners rather than a single combiner processing the signal receptions from the plurality of slave fiberoptic repeaters.

Figure 4:
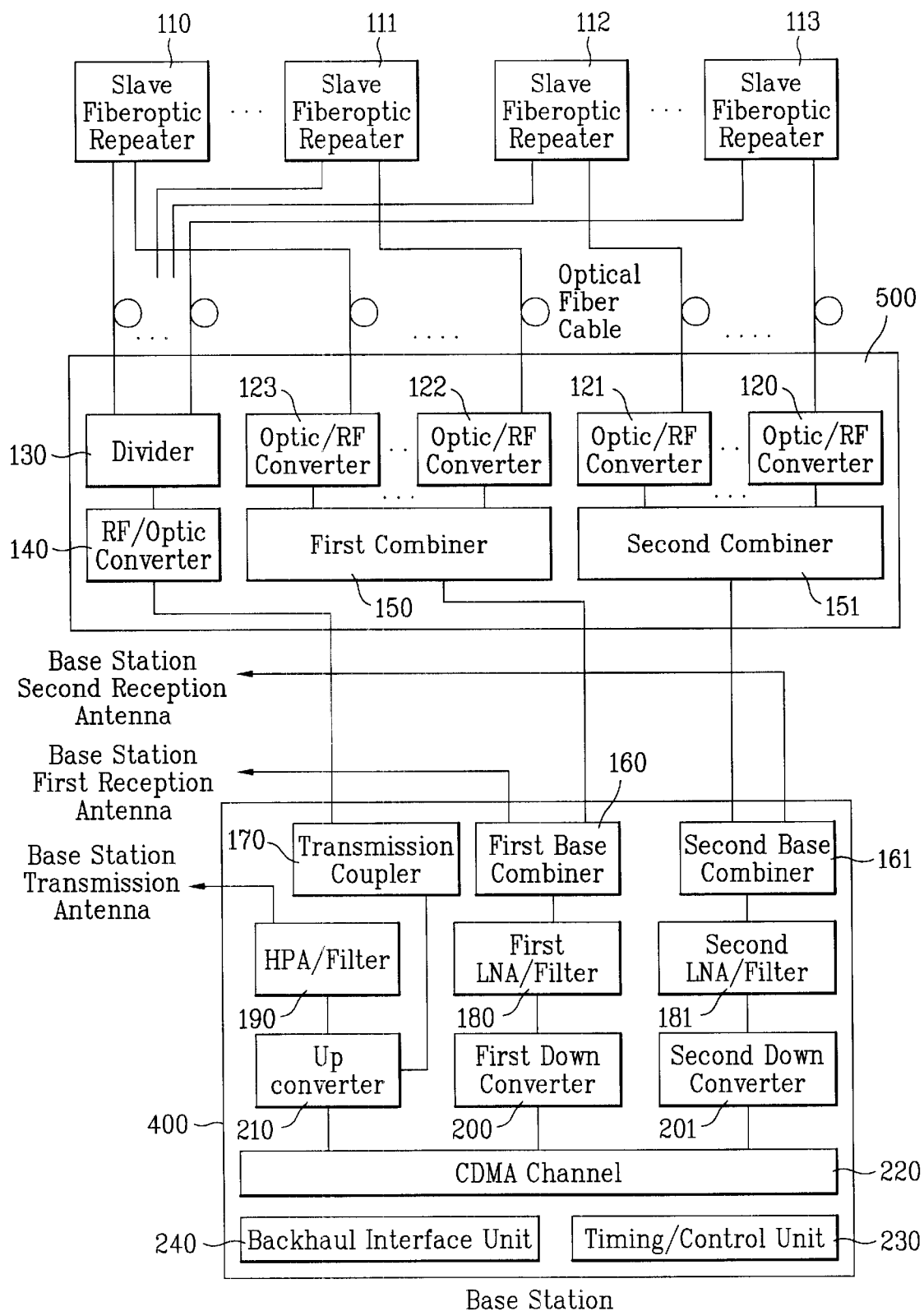
FIG. 4 shows second embodiment of a fiberoptic mobile communication system according to the present invention.

FIG. 4 shows a second embodiment of a fiberoptic mobile communication system including a transmission antenna and two reception antennas; N number of slave fiberoptic repeaters 110–113; a master fiberoptic repeater 500 and a base station 400. A signal from the base station is transmitted in the same manner as in the first embodiment described in reference to FIG. 2. Also, the plurality of slave fiberoptic repeaters functions as described in reference to FIG. 2, each processing a signal received from a reception antenna through a LNA/filter and a RF/Optic converter, and each processing a signal through an optic/RF converter and an HPA/filter prior to transmitting the signal by a transmission antenna. However, the signals received from the slave fiberoptic repeaters are processed differently by the master fiberoptic repeater 500 and the base station 400.

The master fiberoptic repeater 500 includes a RF/optic converter 140 and divider 130 for transmission of a signal. For signal reception, the master fiberoptic repeater 500 includes N number of optic/RF converters 120–123 corresponding to the number of slave fiberoptic repeaters; and a first and second combiners 150, 151. The N number of slave fiberoptic repeaters 110–113 are divided into the number of combiners in the master fiberoptic repeater, in this case two. Afterwards, the first N/2 number of slave fiberoptic repeaters 110–111 are allocated to the first combiner 150 and the second N/2 number of slave fiberoptic repeaters 112–113 are allocated to the second combiner 151. Although the present embodiment allocates the N number of fiberoptic repeaters by simply dividing the number into a first and second halves, the N number fiberoptic repeaters may be allocated to the number of combiners in any manner according to the needs of the system and the designer.

Accordingly, the N number of optic/RF converters 120–123 receives optic cable signals from the N number of slave fiberoptic repeaters 110–113 through optical cables and converts the signals to a RF signals. The first combiner 150 receives the first N/2 number of RF signals from the optic/RF converters 122–123 corresponding to the slave fiberoptic repeaters 110–111 allocated to the first combiner and combines the N/2 number of signals into one signal. The second combiner 151 receives remaining N/2 number of RF signals from the optic/RF converters 120–121 corresponding to the slave fiberoptic repeaters 112–113 allocated to the second combiner 151 and combines the N/2 number of signals into one signal.

The base station 400 has a first and second base combiners 160, 161 receiving the radio signals from the first and second combiners 150, 151. Particularly, the first base combiner 160 receives the combined radio signal of N/2 slave fiberoptic repeaters from the first combiner 150. The first base combiner 160 also receives the radio signal directly from a first base station reception antenna. The first base combiner 160 combines the radio signal received from the first antenna and the radio signal of the N/2 slave fiberoptic repeaters. Likewise, the second base combiner 161 receives the combined radio signal of the remaining N/2 slave fiberoptic repeaters from the second combiner 151 and receives the radio signal directly from a second base station reception antenna. The second base combiner 161 combines the radio signal received from the second antenna and the radio signal of the remaining N/2 slave fiberoptic repeaters.

The combined signals of the first and second base combiners 160, 161 are forwarded to a first and second LNA/filters 180, 181 for amplification and bandpass filtering. Afterwards, the signals are converted to a low frequency by first and second down converters 200, 201 and forwarded to the CDMA channel 220 for transfer to a mobile switching center. A backhaul interface unit 240 and a timing/control unit 230 interfaces the transmission and reception of the signal between the CDMA channel 220 and the mobile switching center. Similar to the first embodiment, the timing/control unit 230 controls the timing of the other elements of the base station 400. Finally, the base station 400 further includes an up converter 210, an HPA/filter 190, and a transmission coupler 170 to process signals for transmission.

During the RF signal reception, a coupling loss results from the combining process. Accordingly, the gain added to an RF signal during the transmission is controlled to match the level of the coupling loss. Also, the transmission coupler 170 is connected to the master fiberoptic repeater 500 and the signal level forwarded to the master fiberoptic repeater 500 is approximately one thousandth of the signal transmitted directly through the transmission antenna.

In sum, a plurality of slave fiberoptic repeaters increases the coverage of the mobile communication for one base station. Moreover, a plurality of combiners can be used in the master fiberoptic repeater without deteriorating the quality of the mobile signal transmission. Particularly, by utilizing two combiners 150 and 151, the reception noise level of N number of slave fiberoptic repeaters is reduced to 10log(N/2). Thus, more slave fiberoptic repeaters can be established per one base station to extend the coverage of the mobile communication, thereby eliminating the need to build numerous and costly base stations.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A communication system, comprising:
    a slave repeater that receives RF signals and outputs repeated RF signals; and
    a base station that has first and second base antennas that each receive RF signals, a first base combiner coupled to receive and combine RF signals from the first base antenna and the repeated RF signals output by the slave repeater, a first down converter coupled to receive and convert combined RF signals outputted from the first base combiner to first baseband signals, a second down converter coupled to receive and convert the RF signals from the second base antenna to second baseband signals, and a CDMA channel that transmits a combination of the first and second baseband signals.

2. The communication system of claim 1, further comprising:
    multiple slave repeaters that each receive RF signals and output the repeated RF signals, wherein the first base combiner is coupled to receive and combine the repeated RF signals output by each of the slave repeaters and the RF signals from the first base antenna.

3. The communication system of claim 1, further comprising:
    multiple slave repeaters that receive RF signals, each slave repeater has an RF/optic converter that converts the received RF signals to optical signals; and
    a master repeater that has an optic/RF converter that converts the optical signals received from each of the slave repeaters into regenerated RF signals and a master combiner that combines the regenerated RF signals received from the optic/RF converter, wherein
    the first base combiner combines the combined RF signals received from the master combiner with the RF signals received from the first base antenna.

4. The communication system of claim 3, further comprising multiple optical cables, wherein each optical cable communicates the optical signals from a separate slave repeater to the master repeater.

5. The communication system of claim 1, further comprising:
    multiple slave repeaters that receive RF signals, each slave repeater has an RF/optic converter that converts the received RF signals to optical signals; and
    a master repeater that has an optic/RF converter that converts the optical signals received from each of the slave repeaters into regenerated RF signals and first and second master combiners that each combine a subset, which is smaller than the entire set, of the regenerated RF signals received from the optic/RF converter, wherein
    the first base combiner combines a first combined subset of the regenerated RF signals received from the first master combiner with the RF signals received from the first base antenna, a second base combiner combines a second combined subset of the regenerated RF signals received from the second master combiner with the RF signals received from the second base antenna, and the group of RF signals combined by the second base combiner are converted by the second down converter into the second baseband signals.

6. The communication system of claim 5, further comprising multiple optical cables, wherein each optical cable communicates the optical signals from a separate slave repeater to the master repeater.

7. A communication system, comprising:
    multiple slave repeaters that each have a slave reception antenna for receiving RF signals, a slave LNA/filter that amplifies and filters the received RF signals, and an RF/optic converter that converts the amplified and filtered RF signals to optical signals;
    a master repeater that has an optic/RF converter that converts the optic signals received from each of the slave repeaters to RF signals and a first master combiner that combines a first subset of the set of regenerated RF signals received from the optic/RF converter;
    a base station that has first and second base antennas for receiving RF signals, a first base combiner that combines the RF signals received from the first base antenna and the first subset of regenerated RF signals received from the first master combiner, a first LNA/filter that amplifies and filters the combined RF signals received from the first base combiner, a first down converter that converts the amplified and filtered RF signals received from the first LNA/filter to first baseband signals, a second LNA/filter that amplifies and filters the RF signals received by the second base antenna, a second down converter that converts the amplified and filtered RF signals received from the second LNA/filter to second baseband signals, and a CDMA channel that combines the first and second baseband signals.

8. The communication system of claim 7, wherein:

the master repeater has a second master combiner that combines a second subset of the set of regenerated RF signals received from the optic/RF converter, both the first and second subsets of regenerated RF signals are smaller than the entire set of regenerated RF signals produced by the optic/RF converter;

the base station has a second base combiner that combines the RF signals received from the second base antenna and the second subset of regenerated RF signals received from the second master combiner; and the second LNA/filter amplifies and filters the combined RF signals received from the second base combiner.

9. A communication device, comprising:

first and second antennas that receive RF signals;

a first combiner that combines the RF signals received from the first antenna and RF signals received from a first RF interface;

a first down converter that converts the combined RF signals received from the first combiner to first baseband signals;

a second down converter that converts the RF signals received from the second antenna to second baseband signals; and a CDMA channel that transmits a combination of the first and second baseband signals.

10. The communication device of claim 9, further comprising:

a second combiner that combines the RF signals received from the second antenna and RF signals received from a second RF interface; wherein the second down converter converts the combined RF signals received from the second combiner to the second baseband signals.

11. The communication device of claim 10, further comprising:

a first LNA/filter that amplifies and filters the combined RF signals received from the first combiner; and a second LNA/filter that amplifies and filters the RF signals received from the second combiner, wherein the first down converter converts the amplified and filtered RF signals received from the first LNA/filter into the first baseband signals, and the second down converter converts the amplified and filtered RF signals received from the second LNA/filter into the second baseband signals.

12. A communication method, comprising:

receiving RF signals with a slave repeater and outputting the received RF signals;

receiving RF signals with first and second base antennas of a base station;

combining the RF signals received from the first base antenna and the RF signals output by the slave repeater with a first base combiner;

converting the combined RF signals received from the first base combiner to first baseband signals with a first down converter;

converting the RF signals received from the second base antenna to second baseband signals with a second down converter; and combining the first and second baseband signals into a CDMA channel.

13. The method of claim 12, further comprising:

receiving RF signals with multiple slave repeaters and outputting the received RF signals; and combining the RF signals output by each of the slave repeaters and the RF signals received from the first base antenna with the first base combiner.

14. The method of claim 12, further comprising:

receiving RF signals with multiple slave repeaters;

converting, at each slave repeater, the received RF signals to optical signals with an RF/optic converter;

converting, at a master repeater, the optical signals received from each of the slave repeaters into regenerated RF signals with an optic/RF converter; and combining the regenerated RF signals received from the optic/RF converter with a master combiner, wherein the first base combiner combines the combined RF signals received from the master combiner with the RF signals received from the first base antenna, and the first down converter converts the combined RF signals received from the first base combiner into the first baseband signals.

15. The method of claim 14, further comprising communicating the optical signals from each slave repeater to the master repeater with a separate optical fiber.

16. The method of claim 12, further comprising:

receiving RF signals with multiple slave repeaters;

converting, at each slave repeater, the received RF signals to optical signals with an RF/optic converter;

converting, at a master repeater, the optical signals received from each of the slave repeaters to regenerated RF signals with an optic/RF converter;

combining a first subset, which is smaller than the entire set, of the regenerated RF signals received from the optic/RF converter with a first master combiner;

combining a second subset, which is smaller than the entire set, of the regenerated RF signals received from the optic/RF converter with a second master combiner;

combining the RF signals received from the first base antenna and the first combined subset of regenerated RF signals received from the first master combiner with the first base combiner; and combining the RF signals received from the second base antenna and the second subset of regenerated RF signals received from the second master combiner with a second base combiner, wherein the first down converter converts the combined RF signals received from the first base combiner into the first baseband signals, and the second down converter converts the combined RF signals received from the second base combiner into the second baseband signals.

17. The method of claim 16, further comprising:

amplifying and filtering, at each of the slave repeaters, the received RF signals before converting the received RF signals to optical signals;

amplifying and filtering the combined RF signals received from the first base combiner before down converting to the first baseband signals; and amplifying and filtering the combined RF signals received from the second base combiner before down converting to the second baseband signals.

* * * * *